United States Patent
Malloy et al.

[11] 3,837,620
[45] Sept. 24, 1974

[54] BUTTERFLY VALVE HAVING AN IMPROVED STEM SEAL

[75] Inventors: Edward D. Malloy, Westmont, N.J.; William L. Parsons, Jr., Drexel Hill, Pa.

[73] Assignee: Garlock, Inc., Palmyra, N.Y.

[22] Filed: Nov. 5, 1973

[21] Appl. No.: 412,764

[52] U.S. Cl. .............................. 251/306, 137/375
[51] Int. Cl. ........................................ F16k 1/226
[58] Field of Search .......... 251/298, 305, 306, 308, 251/214, 173, 175; 137/375

[56] References Cited
UNITED STATES PATENTS

| | | | |
|---|---|---|---|
| 3,073,336 | 1/1963 | Johnson | 137/375 |
| 3,143,132 | 8/1964 | Pangburn | 251/306 X |
| 3,346,005 | 10/1967 | Hanssen | 251/306 X |
| 3,425,439 | 2/1969 | Duffey et al. | 137/375 |
| 3,778,028 | 12/1973 | Graves et al. | 251/306 |
| 3,784,157 | 1/1974 | Wenglar | 251/306 |

*Primary Examiner*—William R. Cline
*Assistant Examiner*—Ira S. Lazarus
*Attorney, Agent, or Firm*—Woodcock, Washburn, Kurtz & Mackiewicz

[57] ABSTRACT

This invention utilizes the pressure of the fluid media being controlled by the butterfly valve to bring about a sealing action around the axis of the valve disc to provide an improved stem seal through the means of a double lip seal operating in a flanged sleeve. The sleeve is an independent member riding between the disc axis and the valve liner thereby preventing the seal from being broken by the radial distortion of the liner when the disc is in a closed position.

12 Claims, 5 Drawing Figures

PATENTED SEP 24 1974 3,837,620
SHEET 2 OF 2
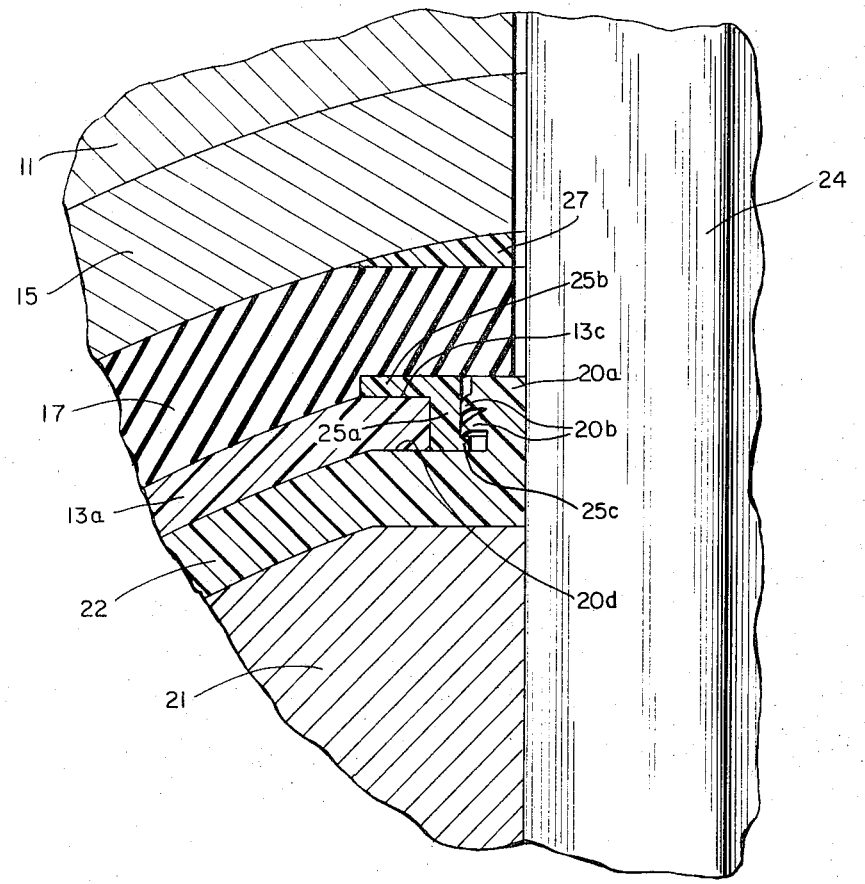
Fig. 3
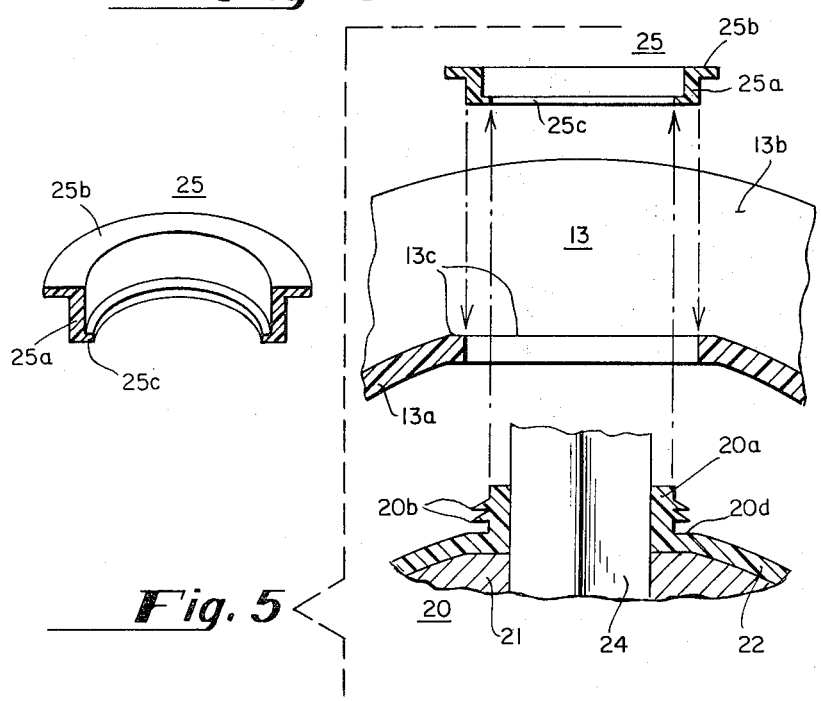
Fig. 4
Fig. 5

3,837,620

BUTTERFLY VALVE HAVING AN IMPROVED STEM SEAL

BACKGROUND OF THE INVENTION

The present invention is directed to butterfly valves having a replaceable resilient backed substantially rigid plastic resin valve liner and disc unit. In butterfly valves of the prior art, the most prevalent problems have been those of sealing around the valve stem and the disc. Most butterfly valves operate on the principle of a relatively high interference between the disc and the liner which as a result causes distortion in the liner when the valve is in a closed position. As a result, any change of temperature, pressure or the position of the butterfly disc can cause the stem seal to be broken which makes it necessary to maintain the seal in these valves by electromeric rings, adjustable glands and other mechanical means.

The present invention is an improvement on the sealing arrangements for butterfly valves disclosed in Buckley et al. U.S. Pat. No. 3,376,014 and Hobson, Jr., U.S. Pat. No. 3,447,780.

SUMMARY OF THE INVENTION

The present invention is directed to a butterfly valve having an improved sealing arrangement which utilizes the pressure of the fluid media controlled by the valve to bring about a sealing action around the axis of the valve disc to bring an improved stem seal through the means of a lip seal operating in a flanged sleeve. The sleeve is an independent member riding between the disc axis and the valve liner, preventing the seal from being broken by the radial distortion of the liner when the disc is in a closed position. In addition, a seal is maintained between the flange of the sleeve and the outer surface of the liner by means of the downward pressure on the flange from an elastomer backup means for the liner and the opposing force as supplied by the interference fit between the liner and the disc. The purpose of this seal construction is to allow the liner to move linearly under the flange when distorted by the disc being moved into the closed position and yet maintain a seal around the axis through the disc. The compression of the elastomer is controlled by means of rigid backup rings designed to give a calculated stress as applied by the elastomer and the interference fit of the liner and disc to remain within the flex limits of the liner material so as to prevent cold flow, which is a major cause of seal failure between the liner and the disc. Seals constructed in accordance with the present invention are capable of functioning and compensating over a wide range of changes in temperature or pressure.

More specifically, butterfly valves constructed in accordance with the present invention include a valve body having a cylindrical bore with diametrically opposed openings for receiving pivot means and a plastic resin lining for the cylindrical bore of the valve body. The lining has a tubular portion adapted to be positioned in the cylindrical bore of the valve body and the tubular portion of the lining is provided with diametrically opposed openings adapted for alignment with the openings in the valve body for receiving the pivot means. Rigid backup ring means is positioned in the cylindrical body and supports resilient backup means with respect to the tubular portion of the lining. A substantially rigid plastic resin encapsulated butterfly disc is positioned within the plastic resin lining on the diameter passing through the aligned openings and is movable between open and closed positions. The valve disc has a diameter related to that of the tubular portion of the valve lining to provide an interference fit therewith when the disc is in a closed position. The butterfly disc has diametrically opposed pivotal ends aligned with the openings in the lining and each of the pivotal ends has sealing means extending circumferentially around the pivotal ends and projecting radially therefrom. The improved stem seal includes a pair of sealing rings, one ring being associated with each of the sealing means on the pivotal ends of the butterfly disc, each of the sealing rings having a tubular portion, the inner surface of which is adapted to engage the radially extending portions of the sealing means, the tubular portion of the sealing rings extending through the diametrically opposed openings in the lining and having an end flange which extends radially between the lining surrounding the diametrically opposed openings and the resilient back-up means, whereby the lining is permitted to move linearly under the flange when distorted by the butterfly disc being moved into the closed position while maintaining a seal around the axis of the butterfly disc. The compression of the resilient backup means is controlled by means of the rigid backup ring means to provide a calculated stress as applied by the resilient backup means and the interference fit of the lining and disc to remain within the flex limits of the lining material so as to prevent cold flow of the lining material.

For a more detailed explanation of the invention and for further objects and advantages thereof, reference is to be had to the following description taken in conjunction with the accompanying drawings.

BRIEF DESCRIPTION OF THE DRAWINGS

FIG. 3 is a fractional view of FIG. 1 on enlarged scale showing the improved stem seal;

FIG. 4 is a perspective view partly in section of the seal ring shown in FIGS. 1 and 3; and FIG. 5 is an exploded view partly in section of the improved stem seal shown in FIGS. 1 and 3.

DESCRIPTION OF PREFERRED EMBODIMENT OF THE INVENTION

Figure 1:
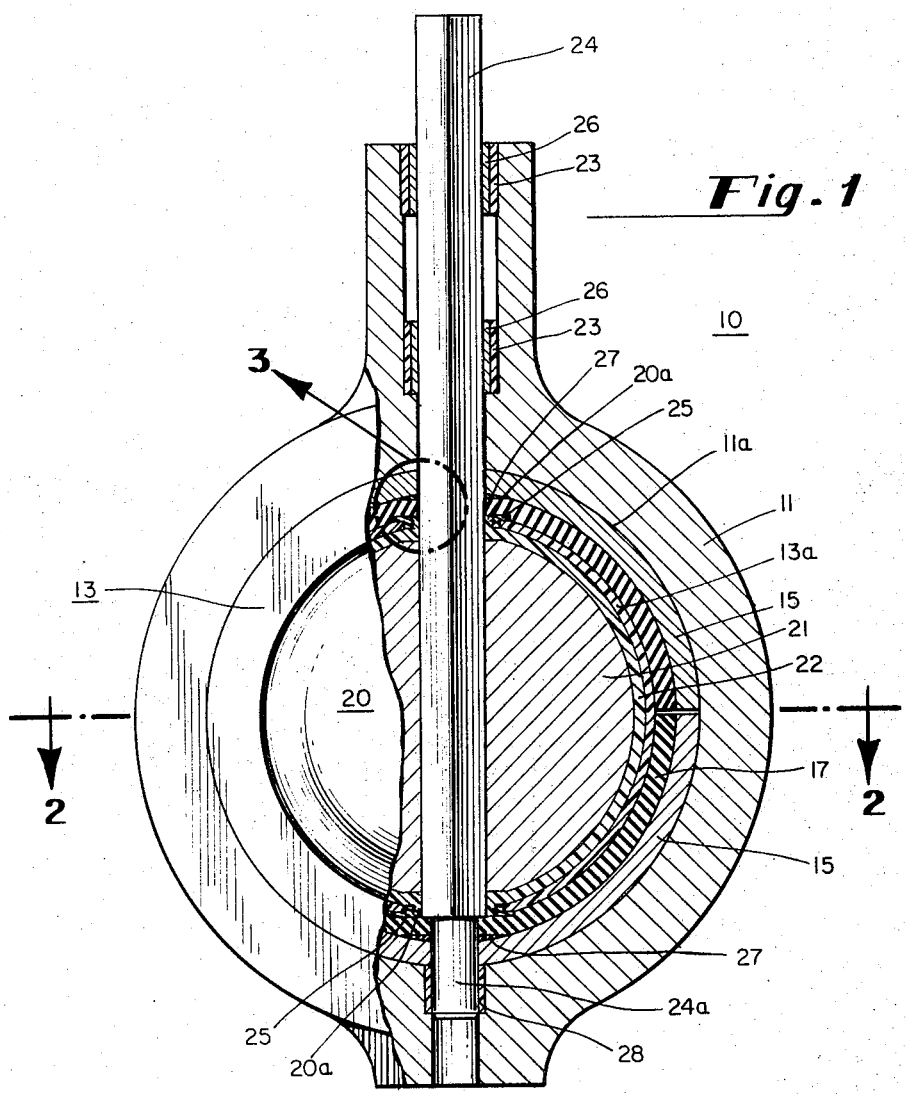
FIG. 1 is an elevational view of the butterfly valve embodying the present invention with portions thereof broken away for clarity.
Figure 2:
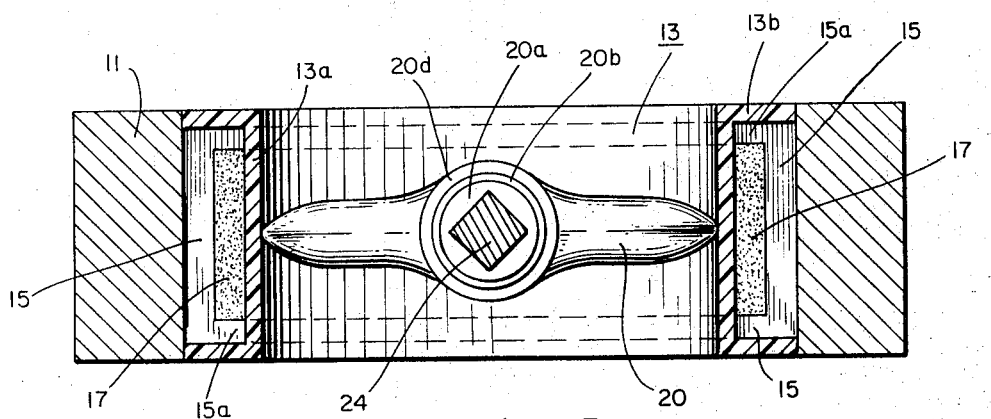
FIG. 2 is a horizontal sectional view of the lower half of the valve in FIG. 1 with the valve disc shown in closed position.

Referring to FIG. 1 of the drawings there is illustrated a butterfly valve 10 embodying the present invention and having portions thereof broken away for purposes of clarity. The valve 10 includes a valve body 11 having a cylindrical bore with diametrically opposed openings for receiving pivot means. The valve body 11 is of conventional construction and may comprise a single member as illustrated in FIG. 1 or it may comprise two parts split horizontally across its diameter. A plastic resin liner or lining 13 is positioned in the cylindrical bore of the valve body 11. In the preferred form of the invention, the lining 13 is a substantially rigid fluorocarbon resin lining selected because of its high resistance to corrosive fluids. The lining 13 has a tubular portion 13a adapted to be positioned in the cylindrical bore of the valve body 11 and has end flanges 13b extending radially outward from the tubular portion 13a. The valve lining 13 shown in FIGS. 1 and 2 is known in the art as the "push-through" type and thus the outside diameter of the end flanges 13b of the lining 13 is substantially the same as the inside diameter of the cylindrical bore of the valve body 11. Rigid backup ring means which preferably comprise a pair of split ring sections 15 are positioned in the cylindrical bore between the valve body and the tubular portion of the lining. The tubular portion 13a of the lining and the rigid backup ring means 15 both have diametrically opposed openings adapted for alignment with the openings in the valve body for receiving pivot means.

The backup rings 15 are each provided with spaced shoulders 15a to form a chamber or groove for receiving resilient backup member 17. The shoulders 15a prevent axial displacement of the resilient backup members 17 with respect to the tubular portion 13a of the lining 13. The resilient backup members 17 are each provided with an opening which is adapted to be aligned with the corresponding openings in the lining 13 and the rigid backup rings 15 through which the pivot means is adapted to extend. The resilient backup members 17 preferably are made of an elastomer such for example as silicone rubber having a 50 to 60 durometer.

As may be seen in FIGS. 1 and 2 there is a substantially rigid plastic resin encapsulated butterfly disc 20 positioned within the plastic resin lining 13 on the diameter passing through the aligned openings therein. The encapsulated disc 20 comprises a metallic core or disc 21 which may be made from any suitable metallic material having the required strength meeting the operating demand such for example as carbon and stainless steel, Monel, Inconel, Hastelloy and the like. The plastic resin coating 22 is applied to the metal disc 21 by encapsulation to obtain practical thickness and meet the required dimension factor. The encapsulated disc 20 is adapted to have an interference fit with the tubular portion 13a of the lining 13. In one form of the invention, this was accomplished by providing the disc 20 with a diameter approximately 0.040 inch greater than the inside diameter of the tubular portion 13a of the lining 13.

As may be seen in FIG. 1, the pivot means for the disc 20 is provided by a shaft 24 which extends through the encapsulated disc 20 and is of square cross section with the lower end of the shaft 24 being provided with a pivot 24a which is cylindrical. The upper portion of the square shaft 24 is adapted to extend through a pair of spaced square hole bushings 26, the outer surfaces of which are cylindrical and are adapted to be positioned in a pair of low friction bushings 23. The lower pivot 24a is likewise adapted to be positioned in a low friction bearing 28.

As may be seen in FIG. 1 the encapsulated butterfly disc 20 is provided with diametrically opposed pivotal ends 20a which are of identical construction and are aligned with the openings in the lining 13. The construction of the pivotal ends 20a of the butterfly disc 20 is most clearly shown in FIG. 3. As maybe seen in FIGS. 3 and 5 each pivotal end 20a of the disc 20 is formed from the resin coating 22 which is the preferred form of the invention comprises a fluorocarbon resin the same as the fluorocarbon resin of the lining 13. The pivotal end 20a is provided with sealing means in the form of a pair of axially spaced lips 20b extending circumferentially around the pivotal end 20a. The outermost lip 20b is shown clearly in FIG. 2. In a preferred form of the invention, the lower surfaces of the lips 20b are horizontal and parallel with the flat surface 20d which surrounds the pivotal end 20a as shown in FIG. 5. The upper surface of the lips 20b is disposed at an angle of approximately 26° with respect to the horizontal. Thus it will be seen that the seal members 20b form wedge shaped seals which extend circumferentially around the pivotal end 20a of the disc 20.

Referring to FIGS. 1 and 3 it will be seen that a pair of sealing rings 25 is provided, one at each end of the disc 20 for cooperation with the sealing means 20b which extend circumferentially around the pivotal ends 20a of the disc 20. The shape of the sealing rings 25 may best be seen in FIG. 4. Referring now to FIG. 3, it will be seen that the sealing ring 25 has a tubular portion 25a which extends through the opening in the tubular portion 13a of the lining 13. The outer surface of the lining 13 surrounding the diametrically opposed openings therein for the pivot means is flat as indicated by the surface 13c and is adapted to be engaged by the lower surface of the end flange 25b of the sealing ring 25. The inner or lower end of the sealing ring 25 is provided with a relatively short end flange 25c which is adapted to engage the flat end 20d of the butterfly disc 20. The sealing means 20b is adapted to engage the inner surface of the tubular portion 25a of the sealing ring 25 and thus provides a double lip seal operating within the flanged sleeve or sealing ring 25. The fluid media within the valve 10 acts against the seal means 20b to bring about a sealing action around the axis of the disc 20 to provide an improved stem seal. It is to be noted that the sleeve or sealing ring 25 is an independent member riding between the disc axis and the liner 13 thereby preventing the seal from being broken by the radial distortion of the liner 13 when the disc 20 is in a closed position.

It will also be noted in FIG. 3 that the resilient member 17 engages the upper surface of flange 25b of the sealing ring 25. Thus a seal is maintained between the flange 25b of the sealing ring 25 and the outer surface 13c of the liner 13 by means of the downward pressure on the flange 25b from the resilient member 17 and the opposing force as supplied by the interference fit between the liner 13 and the disc 20. A further control of the downward pressure on the flange 25b is provided by a pressure pad 27, FIG. 3, which is positioned between the rigid backup ring 15 and the resilient backup member 17. The pressure pad 27 preferably is made from fluorocarbon resin and has an opening therethrough for the pivot or shaft 24. A similar pressure pad 27 is provided at the lower end of the shaft through which lower pivot 24a extends, FIG. 1.

The compression of the resilient backup member 17 is controlled by means of the rigid backup rings 15 which are designed with the appropriate dimensions to provide a calculated stress as applied by the resilient member 17 and the interference fit of the liner 13 and the disc 20 to remain within the flex limits of the lining material so as to prevent cold flow of the material which is a major cause of seal failure between the lining and the disc. From the foregoing it will be seen that with this construction of the stem seal the lining 13 is allowed to move linearly under the flange 25b of the sealing ring 25 when distorted by the disc 20 being moved into the closed position as shown in FIG. 2 and yet such sealing arrangement will maintain a seal at the axis of the disc 20. Stem seals constructed in accordance with the present invention are capable of functioning over and compensating for a wide range in changes in temperature or pressure.

While the present invention has been described in connection with a preferred form of the invention where the valve lining is made of fluorocarbon resin such as "Teflon" and has a substantial thickness, it is to be understood that it is not limited to valve linings of this construction or material but is also applicable to relatively thin plastic linings backed by an elastomer or the like or the lining itself may be an elastomer, such as in U.S. Pat. No. 3,589,678, particularly where the fluid being handled by the valve are not of corrosive nature. Also, the improved stem seal of the present invention is not limited to butterfly valves but is also applicable to ball valves and the like, such as U.S. Pat. No. 3,073,336, which have a rotatable valve member positioned within a valve body and movable between open and closed positions. It is also to be understood that the disc member may be encapsulated with other materials than a fluorocarbon resin. For example, the material may be an elastomer or it may be other suitable plastics. It is further to be understood that the sealing means in the form of the lips 20b which are shown carried by the disc 20 may, in an alternate embodiment of the invention, be formed on the linear tubular surface of the sleeve 25 for engagement with the tubular extension 20a on the disc 20.

It should be understood that the invention is not limited to the specific arrangements shown and that changes and modifications may be made within the scope of the appended claims.

What is claimed is:

1. In a valve of the type including a valve body having a resilient lining having at least one opening for receiving pivot means of a valve member positioned within the lining and rotatable between open and closed positions, the improvement of a stem seal for said valve comprising:

sealing means carried by a pivotal end of said valve member and extending through said opening in said lining, said sealing means extending circumferentially around said pivotal end and projecting radially therefrom, and a sealing ring associated with said sealing means on said pivotal end of said valve member, said sealing ring having a tubular portion the inner surface of which is adapted to engage the radially projecting portions of said sealing means, said tubular portion of said sealing ring extending through said opening in said lining and having an outer end flange which extends radially over the portion of said lining surrounding said opening therein, whereby said lining is permitted to move linearly under said flange when distorted by said valve member being moved into the closed position while maintaining a seal around the axis of said valve member.

2. In a valve of the type according to claim 1 wherein said valve member is encapsulated in a plastic resin and said sealing means is integral with said pivotal end of said plastic resin encapsulated valve member.

3. In a valve of the type according to claim 1 wherein both said sealing means and said sealing ring are constructed from a fluorocarbon resin.

4. In a butterfly valve of the type including a valve body having a cylindrical bore with diametrically opposed openings for receiving pivot means, the improvement comprising:

a resilient lining means for the cylindrical bore of the valve body, said lining having a tubular portion adapted to be positioned in the cylindrical bore of the valve body, said tubular portion of said lining having diametrically opposed openings adapted for alignment with the openings in the valve body and opposed flat surfaces each having said respective openings centered therein, a substantially rigid butterfly disc within said tubular portion of said lining on the diameter passing through said aligned openings and movable between open and closed positions, said disc having a diameter related to that of said tubular portion of said valve lining to provide an interference fit therewith when said disc is in the closed position, said butterfly disc having diametrically opposed pivotal ends aligned with said openings in said lining, each of said pivotal ends having sealing means extending circumferentially around said pivotal ends and projecting radially therefrom, and a pair of sealing rings, one ring being associated with each of said sealing means on said pivotal ends of said butterfly disc, each of said sealing rings having a tubular portion the inner surface of which is adapted to engage said radially extending sealing means, said tubular portion of said sealing rings extending through said diametrically opposed openings in said lining and having an outer end flange which extends radially over the outer one of said flat surfaces of said lining surrounding said diametrically opposed openings, whereby said lining is permitted to move linearly under said flange when distorted by said butterfly disc being moved into the closed position while maintaining a seal around the axis of said butterfly disc.

5. In a butterfly valve according to claim 4 wherein said resilient lining means includes resilient backup means positioned between the cylindrical portion of the valve body and said tubular portion of said lining.

6. In a butterfly valve according to claim 4 including rigid backup ring means positioned in the cylindrical bore and supporting said resilient backup means with respect to said tubular portion of said lining.

7. In a butterfly valve according to claim 6 wherein said rigid backup ring means includes structure for preventing axial displacement of said resilient backup means with respect to said tubular portion of said lining.

8. In a butterfly valve according to claim 6 wherein said tubular portion of said lining is provided with end flanges extending radially outward therefrom, the outside diameter of said end flanges being substantially the same as the outside diameter of said rigid backup ring means.

9. In a butterfly valve according to claim 6 wherein said rigid backup ring means has diametrically opposed openings adapted for alignment with the openings in the valve body and said lining, and pressure pad means surrounding said openings in said rigid backup ring means and positioned between said rigid backup ring means and said resilient backup ring means.

10. In a butterfly valve of the type including a valve body having a cylindrical bore within diametrically opposed openings for receiving pivot means, the improvement comprising:

a plastic resin lining for the cylindrical bore of the valve body, said lining having a tubular portion adapted to be positioned in the cylindrical bore of the valve body, said tubular portion of said lining having diametrically opposed openings adapted for alignment with the openings in the valve body for receiving pivot means, resilient backup means positioned between said tubular portion of said lining and the cylindrical bore of the valve body, a substantially rigid plastic resin encapsulated butterfly disc within said tubular portion of said plastic resin lining on the diameter passing through said aligned openings and movable between open and closed positions, said disc having a diameter related to that of said tubular portion of said valve lining to provide an interference fit therewith when said disc is in the closed position, said butterfly disc having diametrically opposed pivotal ends aligned with said openings in said lining, each of said pivotal ends having sealing means extending circumferentially around said pivotal ends and projecting radially therefrom, and a pair of sealing rings, one ring being associated with each of said sealing means on said pivotal ends of said butterfly disc, each of said sealing rings having a tubular portion the inner surface of which is adapted to engage said radially extending portions of said sealing means, said tubular portion of sid sealing rings extending through said diametrically opposed openings in said lining and having an end flange which extends radially between said lining surrounding said diametrically opposed openings and said resilient backup means, whereby said lining is permitted to move linearly upon said flange when distorted by said butterfly disc being moved into the closed position while maintaining a seal around the axis of said butterfly disc.

11. In a valve of the type including a valve body having a resilient lining having at least one opening for receiving pivotal means of a valve member positioned within the lining and rotatable between open and closed positions, an improved stem seal for said valve comprising:

first sealing means carried by a pivotal end of the valve member and extending through the opening in the lining, said first sealing means extending circumferentially around the pivotal end, and second sealing means surrounding said first sealing means, said second sealing means comprising a sealing ring having a tubular portion the inner surface of which is disposed in face to face relation with the portion of said first sealing means which extends through the opening in the lining, said tubular portion of said sealing ring extending through the opening in the lining and having an outer end flange which extends radially over the portion of the lining surrounding the opening therein, and structure extending circumferentially around one of said sealing means and projecting radially therefrom for engagement with the adjacent face of said other sealing means, whereby the lining is permitted to move linearly under said flange when distorted by the valve member being moved into the closed position while maintaining a seal around the axis of the valve member.

12. A butterfly valve having an improved stem seal comprising:

a valve body having a cylindrical bore with diametrically opposed openings for receiving pivot means, a substantially rigid plastic resin lining for the cylindrical bore of the valve body, said lining having a tubular portion adapted to be positioned in the cylindrical bore of said valve body and having end flanges extending radially outward from said tubular portion, the outside diameter of said end flanges being substantially the same as the inside diameter of the said cylindrical bore of the valve body, rigid backup ring means positioned in said cylindrical bore between said valve body and said tubular portion of said lining, said tubular portion of said lining and said rigid backup means having diametrically opposed openings adapted for alignment with the openings in the valve body for receiving pivot means, resilient backup means positioned between said rigid backup means and said tubular portion of said lining, said end flanges of said lining extending radially over the edges of both of said backup means, a substantially rigid plastic resin encapsulated butterfly disc within said plastic resin lining on the diameter passing through said aligned openings and movable between open and closed positions, said disc having a diameter related to that of said tubular portion of said valve lining to provide an interference fit therewith when said disc is in the closed position, said butterfly disc having diametrically opposed pivotal ends aligned with said openings in said lining, each of said pivotal ends having sealing means extending circumferentially around said pivotal ends and projecting radially therefrom, and a pair of sealing rings, one ring being associated with each of said sealing means on said pivotal ends of said butterfly disc, each of said sealing rings having a tubular portion the inner surface of which is adapted to engage said radially extending portions of said sealing means, said tubular portion of said sealing rings extending through said diametrically opposed openings in said lining and having an end flange which extends radially between said lining surrounding said diametrically opposed openings and said resilient backup means, whereby said lining is permitted to move linearly under said flange when distorted by the butterfly disc being moved into the closed position while maintaining a seal around the axis of said butterfly disc.

* * * * *

PO-1050
(5/69)

UNITED STATES PATENT OFFICE
CERTIFICATE OF CORRECTION

Patent No. 3,837,620     Dated September 24, 1974

Inventor(s)  Edward D. Malloy and William L. Parsons, Jr.

It is certified that error appears in the above-identified patent and that said Letters Patent are hereby corrected as shown below:

Column 1, line 17, correct the spelling of --elastomeric--;

line 30, change the word "bring" to --provide--;

line 66, change the word "body" to --bore--.

Column 3, line 64, change the word "is" to --in--.

Column 5, line 19, before the "U.S." insert the word --in--;

line 29, delete the word "linear" insert the word

--inner--.

Signed and sealed this 13th day of March 1975.

(SEAL)
Attest:

RUTH C. MASON
Attesting Officer

C. MARSHALL DANN
Commissioner of Patents
and Trademarks